(12) United States Patent
Nobata

(10) Patent No.: US 10,811,698 B2
(45) Date of Patent: Oct. 20, 2020

(54) PRODUCING METHOD FOR FUEL CELL SEPARATOR

(71) Applicant: TOYOTA JIDOSHA KABUSHIKI KAISHA, Toyota-shi, Aichi-ken (JP)

(72) Inventor: Yasuhiro Nobata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 72 days.

(21) Appl. No.: 16/058,158

(22) Filed: Aug. 8, 2018

(65) Prior Publication Data
US 2019/0067709 A1    Feb. 28, 2019

(30) Foreign Application Priority Data
Aug. 31, 2017  (JP) .................. 2017-166909

(51) Int. Cl.
*H01M 8/0247*  (2016.01)
*H01M 8/0206*  (2016.01)
*H01M 8/0213*  (2016.01)
*H01M 8/0228*  (2016.01)

(52) U.S. Cl.
CPC ....... *H01M 8/0247* (2013.01); *H01M 8/0206* (2013.01); *H01M 8/0213* (2013.01); *H01M 8/0228* (2013.01)

(58) Field of Classification Search
CPC . H01M 8/0213; H01M 8/0228; H01M 8/0247
USPC .......................................... 429/535
See application file for complete search history.

(56) References Cited

U.S. PATENT DOCUMENTS

2015/0171434 A1*  6/2015  Suzuki ............... C22C 14/00
                                                        429/514

FOREIGN PATENT DOCUMENTS

| JP | 2000-285934 | | 10/2000 |
| JP | 2007042406 A | * | 2/2007 |
| JP | 2016-038981 | | 3/2016 |

* cited by examiner

*Primary Examiner* — James M Erwin
(74) *Attorney, Agent, or Firm* — Finnegan, Henderson, Farabow, Garrett & Dunner, LLP

(57) ABSTRACT

There are included a preparing step of preparing a separator base member having a core member of which surfaces are coated with a coating material having a higher radioparency than that of the core member; a press-forming step of press-forming the separator base member in a predetermined shape; and an examining step of examining the separator base member after the press-forming step using an X-ray having an output at which the X-ray passes through the coating material.

4 Claims, 3 Drawing Sheets

PRODUCING METHOD FOR FUEL CELL SEPARATOR

INCORPORATION BY REFERENCE

The disclosure of Japanese Patent Application No. 2017-166909 filed on Aug. 31, 2017 including the specification, drawings and abstract is incorporated herein by reference in its entirety.

BACKGROUND

1. Technical Field

The present disclosure relates to a producing method for a fuel cell separator having a core member of which surfaces are formed with coat layers.

2. Description of Related Art

A fuel cell (also referred to as a fuel cell stack in some cases) is configured such that a cell (single sell) is formed by holding an electrolyte membrane between an anode and a cathode (also referred to as a cell of a fuel cell in some cases), and multiple cells are laid on one another (stacked) with separators interposed therebetween.

For example, a cell of a solid polymer fuel cell includes a membrane electrode assembly (MEA) composed by an electrolyte membrane having ionic permeability, and an anode catalyst layer (electrode layer) and a cathode catalyst layer (electrode layer) holding the electrolyte membrane between these catalyst layers. On both sides of the MEA, there are formed gas diffusion layers (GDLs) that supply a fuel gas or an oxidant gas, and collect electricity generated by electrochemical reaction. The membrane electrode assembly with the GDLs disposed on its both sides is referred to as a MEGA (membrane electrode and gas diffusion layer assembly), and this MEGA is held between a pair of separators. Here, the MEGAs are a power generator of the fuel cell, and the MEAs serve as a power generator of the fuel cell if there are no gas diffusion layers.

The fuel cell separator is usually provided on its surfaces with coat layers for securing electric conductivity (reducing surface electric resistance), corrosion resistance, and others, and the fuel cell separator is also press-formed so as to exhibit a wavy shape or a recess-projection shape in a sectional view to form grooves (gas flow passages) that serve as flow passages for gas (hydrogen, oxygen, etc.).

In order to obtain a sufficient performance in the above-configured fuel cell, it is important to sufficiently seal the flow passages where the supplied gas flows inside the fuel cell so as to prevent the gas from leaking out from the respective flow passages. For this reason, when fuel cell is produced, it is examined whether or not there is any leakage of the gas from the flow passages.

As an examination method for examining whether or not there is any gas leakage from flow passages in a produced fuel cell, there is proposed, for example, a method that seals flow passages in a fuel cell subject to examination (sample to be examined) while the inside of the flow passages is filled with an examination gas, and detects the examination gas on the outside of the fuel cell, to thereby detect gas leakage (e.g. see the following Japanese Patent Application Publication No. 2016-038981 (JP 2016-038981 A)).

In the following Japanese Patent Application Publication No. 2000-285934 (JP 2000-285934 A), as a method for finding a defect such as a crack generated during pressing and a defect in a coating film (coat layer) generated during corrosion protection coating before the separator is assembled, there is proposed a method that carries out a non-destructive test, such as infrared thermography, eddy-current testing, a magnetic particle testing method, an impregnating method, an ultrasonic inspection method, an electromagnetic induction inspection method, an acoustic emission method, a visual inspection method, a radioscopic examination method, a laser holography method, and an acoustic inspection method, on a surface of a separator after being subjected to press-formation or on a surface of a separator after being subjected to press-formation and further corrosion protection coating onto the surfaces of the separator.

SUMMARY

In the meantime, for the purpose of manufacturing cost reduction or the like, there has recently been considered a method that carries out press-formation of a separator after coat layers are formed on a metallic foil as a core member included in the separator. In the case in which the separator is pressed after the coat layers are formed thereon, even if a crack is generated in the metallic foil during the press-formation, this crack might be covered with a coating material forming the coat layers. However, if a crack is generated in the metallic foil in the above manner, the strength of the metallic foil becomes decreased, and the coat layers formed on the metallic foil are likely to be deteriorated and peel off, and thus the sealing performance might be deteriorated. For this reason, in the producing process of a fuel cell, it is desired to securely detect a crack generated in the metallic foil (in particular, a crack in the metallic foil covered with the coating material forming the coat layers).

Unfortunately, in the leakage examination method of the related art described in JP 2016-038981 A, if the crack generated in the metallic foil is covered with the coating material forming the coat layers as described above, this crack cannot be detected.

In addition, if the coating material forming the coat layers covers the crack generated in the metallic foil, it is impossible to seemingly determine the crack in the metallic foil (that is, the crack in the metallic foil does not appear on the surface); therefore, also in the examination method of the related art described in the above JP 2000-285934 A, it is impossible to securely detect such a crack.

The present disclosure provides a producing method for a fuel cell separator that can securely detect a crack generated in a core member configuring a separator.

An aspect of the present disclosure relates to a producing method for a fuel cell separator formed with coat layers. This producing method includes: preparing a separator base member having a core member of which surfaces are coated with a coating material having a higher radioparency than that of the core member; press-forming the separator base member in a predetermined shape; and examining the press-formed separator base member using an X-ray having an output at which the X-ray passes through the coating material.

The press-formed separator base member may be examined by irradiating the separator base member with the X-ray from a side on which the separator base member is coated with the coating material.

The press-formed separator base member may be examined by using an X-ray having an output at which the X-ray does not pass through the core member.

Both surfaces of the core member may be coated with the coating material so as to prepare the separator base member.

The separator base member may be made of a metal. The coating material may include carbon powder.

According to the present disclosure, even if the separator base member is press-formed after the surfaces of the core member are coated with the coating material (after the coat layers are formed), it is possible to securely detect a crack generated in the core member.

Although it has already been known that a non-destructive test is used to detect a crack generated during pressing (see the above JP 2000-285934 A), only the surface of the separator of which temperature is changed through external heating is measured through the infrared thermography, and there is no finding regarding confirmation of presence or absence of a crack in the core member (metallic foil, etc.) inside the separator using a difference in radioparency between the core member and the coating material; therefore, patentability of the present disclosure is not considered to be denied by these Prior Art documents.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
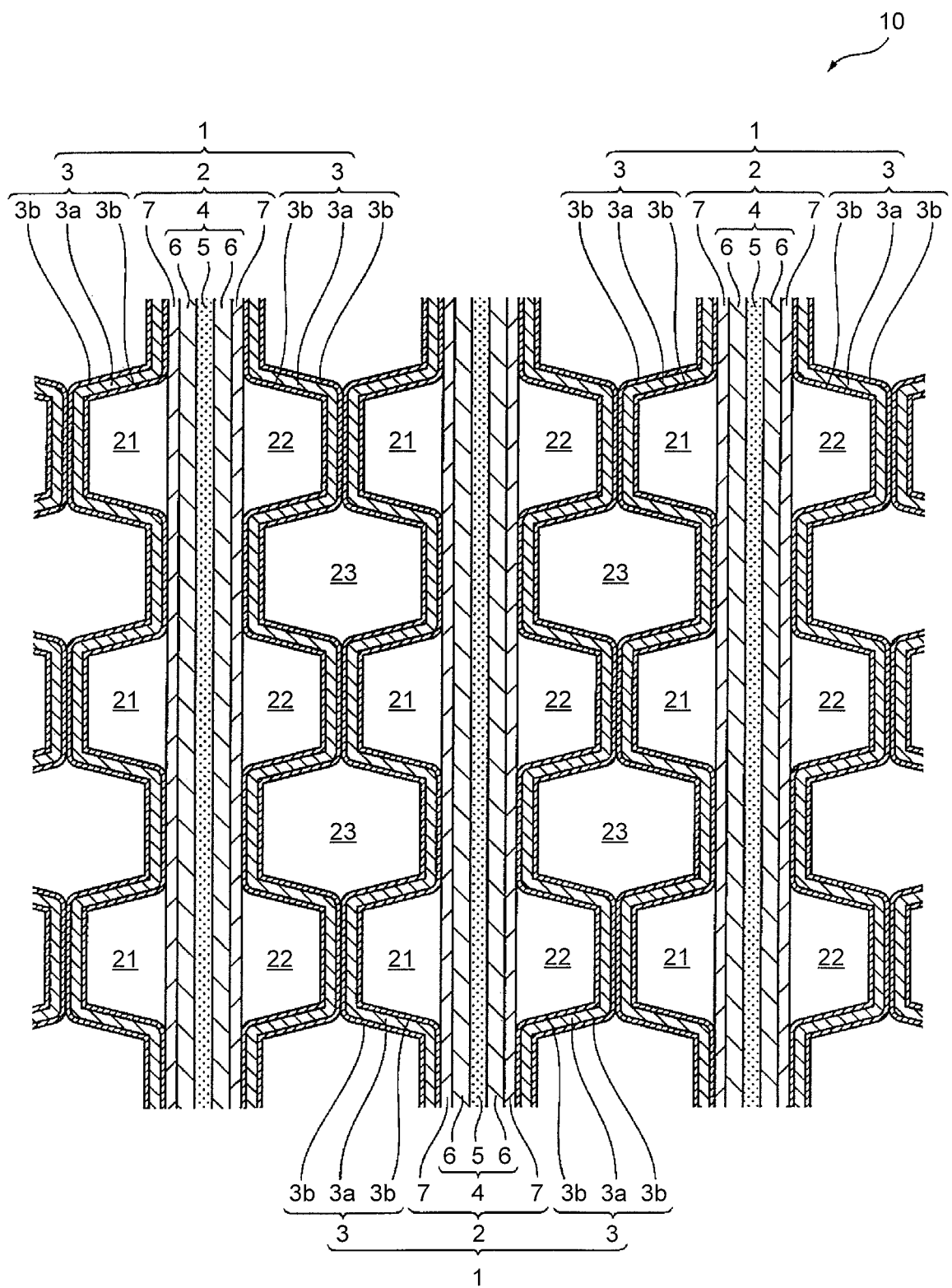
FIG. 1 is a sectional view of a major part of a fuel cell stack including separators.

Hereinafter, a configuration of the present disclosure will be described in detail based on one example of an embodiment shown in the drawings. As one example, the case in which the present disclosure is applied to a fuel cell installed in a fuel cell vehicle or a fuel cell system including this fuel cell will be exemplified, but an application range of the present disclosure is not limited to such an example.
Configuration of Fuel Cell Stack Including Separators FIG. 1 is a drawing of a major part of a fuel cell stack (fuel cell) 10 in a sectional view. As shown in FIG. 1, in the fuel cell stack 10, multiple cells (single cells) 1 as base units are stacked. Each cell 1 is a solid polymer fuel cell that generates an electromotive force by electrochemical reaction between an oxidant gas (such as air) and a fuel gas (such as hydrogen). Each cell 1 includes: a MEGA 2; and separators (fuel cell separators) 3 in contact with this MEGA 2 so as to partition this MEGA 2 by the separators. In the present embodiment, the MEGA 2 is held between a pair of separators 3.

Each MEGA 2 is formed by integrating a membrane electrode assembly (MEA) 4 with gas diffusion layers 7 disposed on both sides of this MEA 4. Each membrane electrode assembly 4 includes an electrolyte membrane 5, and a pair of electrodes 6 joined to each other with the electrolyte membrane 5 interposed therebetween. The electrolyte membrane 5 is formed by an ion exchange membrane having proton conductivity formed by a solid polymer material, and each electrode 6 is formed by, for example, a porous carbon material supporting a catalyst such as platinum thereon; for example. An electrode 6 located on one side of the electrolyte membrane 5 becomes an anode, and an electrode 6 located on the other side thereof becomes a cathode. The gas diffusion layer 7 is formed by an electric conductive material having gas permeability, for example, a carbon porous material such as carbon paper or carbon cloth, or a metallic porous material such as a metal mesh or a metal form.

In the present embodiment, the MEGAs 2 serve as a power generator of the fuel cell 10, and each separator 3 is in contact with gas diffusion layer 7 of each MEGA 2. When the gas diffusion layers 7 are omitted, the membrane electrode assemblies 4 serve as the power generator; and in this case, each separator 3 is in contact with each membrane electrode assembly 4. Therefore, the power generator of the fuel cell 10 includes the membrane electrode assemblies 4 that are in contact with the separators 3.

Each separator 3 is a plate-like member having a core member (base member) 3a made of a metal (e.g. metal such as SUS, titanium, aluminum, copper, and nickel) excellent in electric conductivity and gas impermeability, and one surface of the separator 3 is in contact with the gas diffusion layer 7 of each MEGA 2, and the other surface thereof is in contact with the other surface of another adjacent separator 3.

In the present embodiment, on one surface and the other surface (a surface in contact with the gas diffusion layer 7 of each MEGA 2 and a surface in contact with the other surface of another adjacent separator 3) of (the core member 3a of) each separator 3, respectively, there are formed coat layers (carbon layers) 3b as electric conductive coating films made of a coating material produced by kneading carbon powder (powdered carbon) with binder resin such as thermosetting resin, for example. Note that an intermediate layer (not illustrated) may be provided between the core member 3a and each coat layer 3b that form each separator 3, for the sake of securing tight contact between the core member 3a and each coat layer 3b.

The coat layer 3b may have at least electric conductivity and corrosion resistance, and an example of thermosetting resin forming the coat layer 3b may include phenol resin, urea resin, melamine resin, unsaturated polyester resin, epoxy resin, or the like.

In the present embodiment, each separator 3 is formed in a wavy shape or a recess-projection shape (as its sectional shape). The shape of each separator 3 is formed such that each wave is formed in an isosceles trapezoid shape, and a top portion of the wave is generally flat, and both ends of the top portion are angular with equal angles. That is, each separator 3 generally has the same shape as viewed from the front side or from the rear side. The top portions of the separator 3 are in surface contact with the gas diffusion layer 7 on one side of the MEGA 2, and top portions of another separator 3 are in surface contact with the gas diffusion layer 7 on the other side of the MEGA 2.

Each separator 3 is so formed (plastically deformed) as to exhibit the above shape by press-forming using a die a separator base member having the coat layers 3b formed on the surfaces (the both sides) of the core member 3a (described later).

Gas flow passages 21 defined between each gas diffusion layer 7 and each separator 3 on the one electrode (i.e. anode) 6 side are flow passages where a fuel gas flows, and gas flow passages 22 defined between each gas diffusion layer 7 and each separator 3 on the other electrode (i.e. cathode) 6 side are flow passages where an oxidant gas flows. When the gas flow passages 21 on one side that face the gas flow passages 22 via each MEGA 2 are supplied with the fuel gas and the gas flow passages 22 on the other side are supplied with the oxidant gas, electrochemical reaction is caused in the cell 1 so as to generate an electromotive force.

In addition, a cell 1 of interest and another cell 1 adjacent to this cell 1 are arranged such that an electrode 6 serving as an anode and an electrode 6 serving as a cathode face each other. Top portions of the separator 3 on the back surface side disposed along the electrode 6 serving as the anode of the cell 1 of interest are in surface contact with top portions of the separator 3 on the back surface side disposed along the electrode 6 serving as a cathode of another cell 1 adjacent to the cell 1 of interest. Water as a coolant for cooling the cells 1 flows through spaces 23 defined between the separators 3, 3 that are in surface contact with each other in each two adjacent cells 1.

Producing Procedure of Separator

Figure 2:
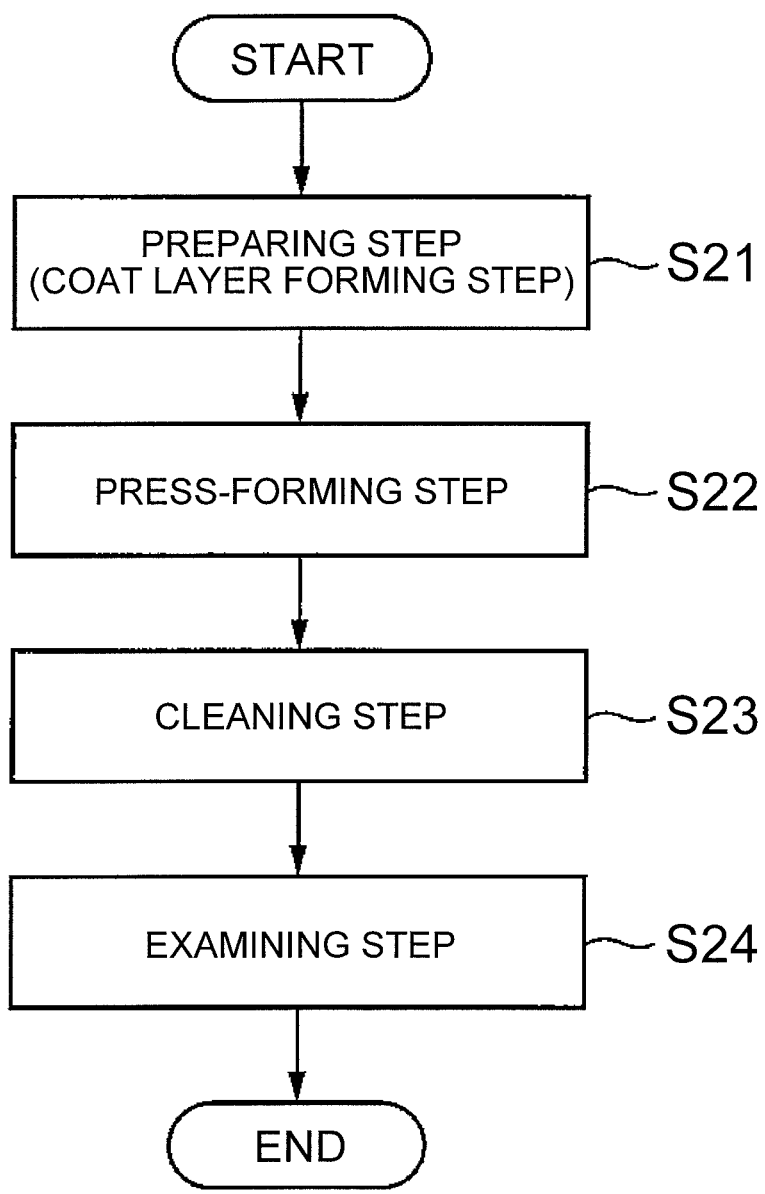
FIG. 2 is a flowchart showing an outline of a producing procedure of the separator.
Figure 3:
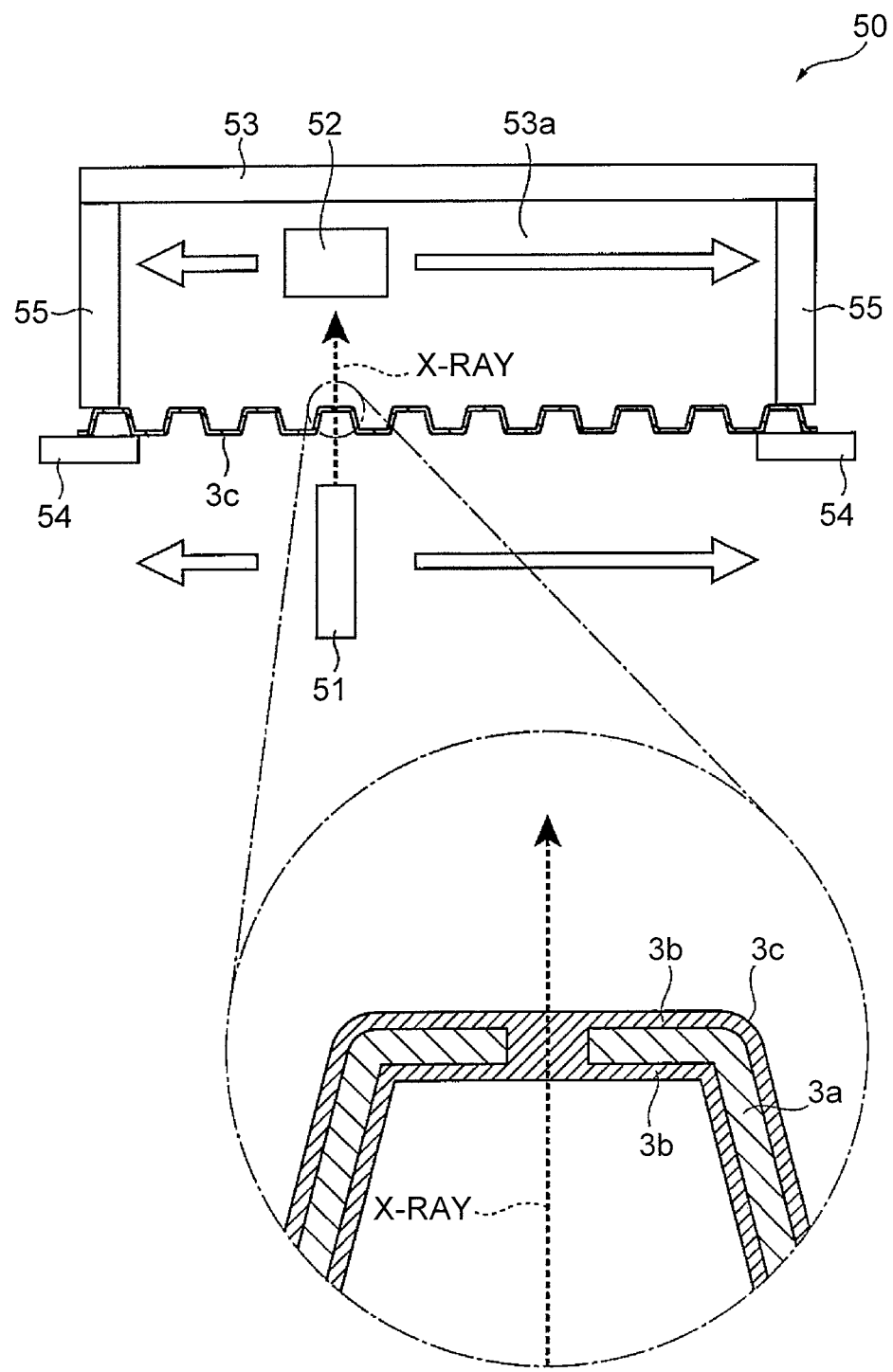
FIG. 3 is a schematic view of an X-ray examining apparatus used in an examining step.

Next, a producing method for the above-described separator 3 will be described. FIG. 2 is a view showing a schematic flow of the producing procedure of the separator. FIG. 3 is a schematic view of an X-ray examining apparatus used in an examining step in the producing procedure of the separator.

When the separator 3 is produced, as shown in FIG. 2, first, surfaces (both surfaces) of the flat plate-like shaped core member (e.g. a metallic foil made of SUS, titanium, or the like) 3a are coated with a coating material so as to form the coat layers 3b, to thereby prepare a separator base member as a base member for the separator 3 (before being formed) (S21: preparing step (coat layer forming step)). The coating material (material forming the coat layer 3b) used in this step is a material in a paste form prepared by kneading (mixing) carbon powder with binder resin such as a thermosetting resin or the like, for example, to thereby form a material having a higher radioparency than that of the core member 3a (described later). The coat layer 3b may be formed by applying nano-sized carbon powder onto the surfaces of the core member (metallic foil) 3a, and thereafter, subjecting this to a redox treatment so as to fix the carbon powder on the surfaces of the core member.

Next, the separator base member is press-formed by using a die (S22: press-forming step). Through this step, the separator base member is formed in a wavy shape or a recess-projection shape (in a sectional view as viewed in a predetermined direction), and the gas flow passages are thus formed.

Next, the separator base member after being press-formed (after the press-forming step (S22)) is cleaned (subjected to UV-cleaning, or the like) (S23: cleaning step).

Using an X-ray examining apparatus, an examination on the separator base member after the cleaning (after the cleaning step (S23)) is carried out (S24: examining step).

Specifically, as shown in FIG. 3, an X-ray generator 51 and an X-ray detector 52 are set such that the X-ray generator 51 and the X-ray detector 52 face each other with a separator base member 3c after being cleaned interposed therebetween. The X-ray detector 52 is disposed in an X-ray darkroom 53a surrounded by a cover 53 for the purpose of preventing entry of the X-ray from the outside and leakage of the X-ray to the outside. After a masking jig 54 is set, the separator base member 3c is pressed by a pressure die 55 to be sealed (also referred to as "masked"). The X-ray generator 51 and the X-ray detector 52 are relatively movable with respect to the separator base member 3c so as to scan all regions of the separator base member 3c that are desired to be examined.

As described above, after the separator base member 3c is set on the X-ray examining apparatus 50 including the X-ray generator 51, the X-ray detector 52, and others, while the X-ray generator 51 and the X-ray detector 52 are relatively moved with respect to the separator base member 3c, the separator base member 3c (i.e. the surface of the separator base member 3c coated with the coating material, that is, the surface thereof on which the coat layer 3b is formed) is irradiated with an X-ray from the X-ray generator 51. At this time, the X-ray to be applied is set to have an output at which the X-ray passes through the coat layer 3b (in other words, the coating material forming the coat layer 3b) of the separator base member 3c, but does not pass through the core member 3a. The output of the X-ray can be adjusted by changing a distance between the X-ray generator 51 and the separator base member 3c.

Accordingly, if a crack (e.g. a pin hole of several micrometers to several dozen micrometers) is present in the core member 3a, the X-ray applied from the X-ray generator 51 passes through the crack in the core member 3a (in other words, leaks out from the crack in the core member 3a), and is detected by the X-ray detector 52 disposed in the X-ray darkroom 53a; therefore, it is possible to detect a crack generated in the core member 3a (particularly, a crack in the core member 3a covered with the coating material forming the coat layers 3b (in other words, a crack in the core member 3a under the coat layers 3b)). In the X-ray detector 52, by fetching a measured X-ray image, measuring differences in the image by predetermined software, and displaying present or absence of abnormality in the differences in the image, it is possible to examine presence or absence of a crack in the core member 3a in a simple way.

The separator base member 3c after the examining step (S24), getting through a gasket assembly step, is assembled as the separator 3 into the fuel cell 10.

As described above, in the present embodiment, in the examining step (S24), by carrying out the examination using the X-ray having an output at which the X-ray passes through the coat layer 3b (i.e. the coating material forming the coat layer 3b) but does not pass through the core member 3a, it is possible to securely detect a crack generated in the core member 3a even if the separator base member is press-formed after the surfaces of the core member 3a are coated with the coating material (after the coat layers 3b are formed).

The embodiments of the present disclosure have been described in detail with reference to the drawings; however, specific configurations are not limited to these embodiments, and if there are design changes, etc., without departing from the scope of the present disclosure also, they are intended to be included in the present disclosure.

What is claimed is:

1. A producing method for a fuel cell separator formed with coat layers, the producing method comprising:
   preparing a separator base member having a core member of which surfaces are coated with a coating material having a higher radioparency than that of the core member;
   press-forming the separator base member in a predetermined shape;
   examining a surface of the press-formed separator base member using an X-ray having an output at which the X-ray passes through the coating material but does not pass through the core member; and
   detecting whether a crack is present in the core member based on the examining the surface of the press-formed separator base member, via an X-ray detector configured to detect a presence of the crack in the core member by detecting the output of the X-ray passing through the crack.

2. The producing method for the fuel cell separator according to claim 1, wherein
the press-formed separator base member is examined by irradiating the separator base member with the X-ray from a side on which the separator base member is coated with the coating material.

3. The producing method for the fuel cell separator according to claim 1, wherein
both surfaces of the core member are coated with the coating material so as to prepare the separator base member.

4. The producing method for the fuel cell separator according to claim 1, wherein
the core member is made of a metal, and the coating material includes carbon powder.

\* \* \* \* \*